(12) United States Patent
Fehn

(10) Patent No.: US 6,194,043 B1
(45) Date of Patent: Feb. 27, 2001

(54) CONTAINER WITH RECYCLED PLASTIC

(75) Inventor: Gregory M. Fehn, Barrington, IL (US)

(73) Assignee: Continental Plastic Containers, Inc., Norwalk, CT (US)

( * ) Notice: Subject to any disclaimer, the term of this patent is extended or adjusted under 35 U.S.C. 154(b) by 0 days.

(21) Appl. No.: 08/917,044

(22) Filed: Aug. 19, 1997

Related U.S. Application Data

(62) Division of application No. 08/284,893, filed on Aug. 2, 1994, now Pat. No. 5,693,283.

(51) Int. Cl.$^7$ .................................................. B32B 27/00
(52) U.S. Cl. .................. 428/36.91; 428/35.7; 428/36.7; 428/36.6; 428/421; 428/515; 428/516; 428/517; 428/518; 428/903.3; 215/12.1; 215/12.2; 220/459; 220/62.12; 220/62.13; 426/127
(58) Field of Search ................... 428/35.7, 36.6, 428/36.7, 36.91, 421, 515, 516, 517, 518, 903.3; 215/12.1, 12.2; 220/459, 62.12, 62.13; 426/127

(56) References Cited

U.S. PATENT DOCUMENTS

| | | | |
|---|---|---|---|
| 4,824,618 | * | 4/1989 | Strum et al. ............................ 264/37 |
| 4,880,675 | * | 11/1989 | Mehta ................................. 428/35.7 |
| 4,894,291 | * | 1/1990 | Ofstein ................................. 428/518 |
| 4,982,872 | * | 1/1991 | Avery ................................... 220/461 |
| 4,999,254 | * | 3/1991 | Ofstein ................................. 428/518 |
| 5,049,449 | * | 9/1991 | Ofstein ............................. 428/476.1 |
| 5,064,724 | * | 11/1991 | Ofstein ................................. 428/501 |
| 5,196,469 | * | 3/1993 | Cushing et al. ..................... 524/300 |
| 5,238,718 | * | 8/1993 | Yano et al. ......................... 428/35.7 |
| 5,508,076 | * | 4/1996 | Bright ................................ 428/36.6 |
| 5,534,351 | * | 7/1996 | Pearson et al. ...................... 428/516 |
| 5,712,009 | * | 1/1998 | Moore et al. ....................... 428/35.7 |

\* cited by examiner

*Primary Examiner*—Charles Nold
(74) *Attorney, Agent, or Firm*—Eugene F. Friedman

(57) ABSTRACT

A container incorporating post-consumer recycled ("PCR") plastic and a method of making that type of container. The container utilizes a layer of polypropylene or EVOH or a film of fluorinated polyethylene toward the interior from the recycled plastic to prevent contaminants from the latter entering the container's contents. When utilizing EVOH, the container usually has an additional layer of polyethylene or polypropylene covering the EVOH to prevent its deterioration by moisture. Making the container involves first composing a resin including the recycled plastic. Forming the various layers listed above produces a container that includes recycled plastic and a barrier to limit the migration of contaminants f from the recycled material to the container's contents. This permits the use of the resulting containers for food. For a fluorinated polyethylene film, fluorination can occur either during or after the container's formation.

21 Claims, 1 Drawing Sheet

CONTAINER WITH RECYCLED PLASTIC

This is a division of application Ser. No. 08/284,893, filed Aug. 2, 1994 U.S. Pat. No. 5,693,283.

BACKGROUND

Plastic containers, for an extensive period of time, have found widespread use in society for holding a vast array of goods. In fact, such containers have become so omnipresent that their disposal now poses a substantial problem. Society no longer wishes to place the used containers into the very limited landfill left to it.

Accordingly, recent years have witnessed a substantial effort to recycle plastic containers. This would accomplish several desirable results. First, it will help save the limited resources of our planet for future generations. Furthermore, recycling will have the obvious effect of conserving the landfill that remains available.

However, much plastic finds use in containers that hold food items. Most desirably, recycling must employ previously used plastic in new food containers. In fact, various legislative bodies are considering the requirement that a certain portion, generally around 25 percent, of all containers, including specifically those intended for food, must consist of recycled plastic.

The problem with utilizing recycled plastic in food containers results from the fact that these containers have previously held all types of materials. Many of these materials, for one reason or another, constitute contaminants should they enter food items above a negligible concentration.

The essential problem arises, of course, from the fact that contaminants found in recycled plastic, because of their previous use, could leach out of the new containers and into the food. A brief acknowledgment of the wide variety of uses that plastic containers find shows the magnitude of the concern. Thus, plastic holds everything from food itself including milk to chemicals such as herbicides and insecticides that could prove toxic to humans and other animals.

Consumers may exacerbate the problem. After emptying the contents of a plastic container, they may reuse it to hold chemicals of an entirely different, and perhaps more ominous nature, than the originally held ingredients. These may include everything from used motor oil to all types of poisons. These containers too, after their initial and subsequent uses by the consumer, may enter the recycling stream. Any use of the plastic from these containers in recycling must provide absolute assurance that whatever such containers may have held will pose no danger to food consumed by individuals.

The United States Food and Drug Administration (FDA) has determined that a contaminant on a level below 0.5 parts per billion in ingested food presents substantially no risk of harm to humans. Thus, any use of recycled plastic in containers must provide assurance that it will not cause the exceeding of that level of undesired foreign substances in a person's diet. In particular, the FDA requires a demonstration, under adverse conditions, of protection against four classes of chemicals; these classes include volatile and nonvolatile, polar and nonpolar organic compounds, as well as a heavy-metal salt and a polymer-specific chemical. Thus, the intended manner of use of post-consumer recycled ("PCR") plastic must show that it will not introduce more than the indicated amount of contaminant into food.

One particular method of employing recycled resin involves placing a barrier layer on the inside of the previously used plastic. Such a barrier must prevent the passage of contaminants into a container's interior holding a food-like substance, generally an ethyl alcohol solution. One test for establishing this barrier capacity involves placing the container made of or with the proposed barrier and containing the alcohol solution in essentially pure contaminant. Alternatively, the test may involve placing the contaminant on the exterior of a container with the barrier material.

The need for a barrier, however, only exists when the contaminant level within the recycled plastic exceeds certain maximum levels. Below those levels, as suggested in the FDA Points to Consider for the Use of Recycled Plastics in Food Packaging: Chemistry Considerations (May, 1992), an insufficient amount of contaminant could possibly leach into the container's contents to create a health risk. The calculation assumes that all of a contaminant in the PCR resin will enter the container's food. In the case of polyolefins, that contaminant level currently stands at 48 parts per billion (ppb.) for a container having a PCR layer 0.020 inch thick. A thicker layer will have more contaminant and cause the permissible level to proportionately decline. Several layers with PCR introduce additive quantities of the contaminant. This has special significance since much PCR resin has a majority of polyethylene. Polyethylene terepthalate ("PET"), by comparison, may have a residue of 215 ppb. Between those two sit polystyrene at 180 ppb. and polyvinyl chloride at 90 ppb. Decreasing the PCR layer thickness increases the allowable contaminant level. Only the thickness of the layers within the PCR are considered in this determination. Diluting the PCR with virgin resin proportionately increases the permissible contaminant level in the unmixed PCR.

The current recycling process does appear to reduce the concentration of some contaminants in previously used resin. However, the present treatment of recycled materials does not seem to currently offer the hope of reducing the residue level of all contaminant types to below these limits.

Accordingly, the search continues for barriers that will permit the use, and perhaps the required use, of recycled plastic for food containers. Yet, the barrier should not prohibitively increase the cost of the resulting containers.

SUMMARY

Various materials that have experienced substantial use for other purposes have provided the very pleasant surprise of acting as barriers to the migration of contaminants from recycled plastics into a container's interior. Ethyl vinyl alcohol (EVOH) has often acted as a barrier against the passage of gaseous or dissolved oxygen through plastic. Polypropylene by itself forms containers of improved heat resistance and clarity. Fluorinating a polyolefin provides it with a less tacky surface and helps prevent the escape of certain volatile organic liquids held in the container. However, a substantially continuous film of any of these materials either alone or in combination now appears to provide an effective barrier against the migration of contaminants into a container's interior.

In general terms, a container has a wall which defines an interior and an exterior. Since a large proportion of recycled plastic takes the form of polyethylene, at least one layer in the container wall would typically include a polymer of that type.

An effective barrier then requires a substantially continuous film of the appropriate material. The film occurs at the portion of the part of the wall wherever the layer of PCR occurs. It has a location, at that portion, toward the interior of the container from the first, or recycled polyethylene polymer, layer.

Generally, the film should display no discontinuities to provide the best barrier. Minor gaps might not prove intolerable, depending upon the conditions, so long as the contaminant concentration reaching the container's interior remained below the level of unacceptability as discussed above.

Regardless of the exact nature of the barrier, it should have a sufficient thickness and capability to prevent the passage of more than one percent of the contaminants in the PCR layer into the container's contents in 10 days. As an alternative guideline, the barrier should prevent the entrance from the PCR layer into the container's interior of contaminants exceeding 20 ppb. of the weight of the container's contents, also over a 10-day period. These limits take into consideration the "consumption factor" put forth by the FDA as discussed below, to keep the total ingested level below 0.5 ppb. of a person's diet.

Where the continuous film has a composition of polypropylene, the exteriorly located layer may take the form of any polyethylene. The polypropylene serves most importantly to prevent migration of unacceptable quantities of contaminants from the polyethylene into the container's interior. It may also, however, serve other purposes such as physical protection or guarding against chemical attack from the container's contents. Thus, it may possibly find use for lining polyethylene not derived from a recycled source.

EVOH has provided an oxygen barrier in containers made of various types of polyolefins. However, no one has previously recognized that it will provide an adequate barrier to the passage of contaminants from recycled plastic. This gives EVOH a new use which allows concomitantly the reuse of plastic in food containers rather than merely non-food applications or burying or other disposal.

Fluorinating a polyethylene provides it with a Teflonlike, nonsticky surface with improved resistance to the escape of volatile organic liquids. However, where that or another polyethylene layer carries contaminants, the fluorinated film acts as a barrier against the contaminants' migration into the container.

The method of making a container utilizing either polypropylene, EVOH, or a fluorinated polyolefin as a barrier against contaminants first involves composing a resin incorporating post-consumer recycled thermoplastic containing polyethylene. Then occurs the molding of the container having a wall defining an interior and an exterior.

The actual molding includes forming from the resin incorporating the PCR a layer of at least part of the wall. In the case of a polypropylene or EVOH barrier, a second layer is formed at the part of the wall having the PCR resin. The second layer has a substantially continuous film of polypropylene or EVOH, as the case may be. This film of the polypropylene or the EVOH occurs at the portion of the wall wherever the first layer with the PCR resin occurs. The film of the polypropylene or EVOH must have a location toward the interior of the container from the first layer with the PCR in order to act as a barrier to the migration of possible contaminants within the PCR.

Oftentimes, where the barrier utilizes EVOH, the making of the container also involves forming a third layer which places a continuous film of polyethylene or polypropylene at the location of the EVOH but toward the interior of the container. This provides EVOH with protection against moisture which shows a tendency to degrade its capability of blocking the passage of gases into the container. An adhesive on either side of the EVOH will prevent or at least reduce delamination of the various layers from each other.

The use of a fluorinated polyolef in as a barrier does not necessarily involve the formation of a separate identifiable layer of the barrier compound. Rather, the requisite film of fluorinated polyolefin proceeds through the formation of a continuous film of the fluorinated polyethylene. This film should occur at a portion of the part of the wall of the container wherever the layer of recycled resin occurs. Naturally, it lies towards the interior of the container from the PCR. The formation of this film of fluorinated polyethylene typically occurs through the direct fluorination of polyethylene already present in the container. This requires merely the contacting of the polyethylene with the fluorine gas at reactive temperatures. This may specifically occur either during or after the molding of the container itself.

DETAILED DESCRIPTION

Figure 1:
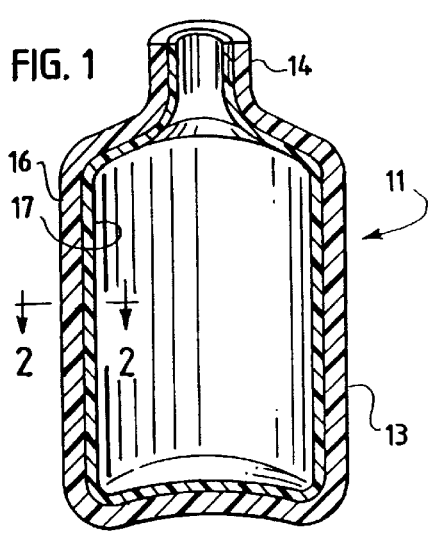
FIG. 1 gives a cross-sectional view of a container formed from two layers of plastic, with the outer layer including PCR covered by an inner layer of polypropylene.

The FDA has determined that contaminant concentrations of less than 0.5 ppb. in the food stream does not cause an appreciable likelihood of harm to humans. Incorporating various assumptions including a "consumption factor" of 0.33 in the Points to Consider . . . paper alluded to above, the FDA has determined the level of contaminants in various types of materials used in containers that will not result in exceeding the limit for consumption of food held by the container. In the case of polyolefins, that level amounts to 48 ppb. for 0.020 in. layer. In other words, if a polyolefin contains less than 48 ppb. of contaminant, then the FDA has determined that food in contact with that polyolefin as a container wall 0.020 in. thick will not receive the contaminants in an amount that will cause the exceeding of the 0.5 ppb. dietary limit. Decreasing the consumption factor proportionately increases the tolerable contaminant level. Thus, a consumption factor of 0.10 will give a limit of about 150 ppb./0.020 in. for the polyolefin. The polyolefin simply has insufficient contaminant to leach into the food in an amount that could cause danger to humans ingesting that food. Accordingly, if the post-consumer reground polyolefin resin had less than 48 ppb. of any deleterious contaminant, then it could find direct use in a food container where it would make direct contact with the food itself.

However, assuring that the PCR resin will only contain contaminants below this level does not appear feasible. No selection process even appears on the horizon that would separate PCR polyolefins with no contaminant above that level from those with excessive amounts of unacceptable chemicals. Further, no method of reprocessing PCR polyolefin resin has the ability of economically reducing all contaminants below the acceptable level. Accordingly, the use of PCR resin necessitates the employment of a barrier that will prevent the migration of contaminants from the PCR resin of a container wall into the food held by that container.

Polypropylene, EVOH, and fluorinated polyethylene have each shown the ability to act as a barrier to the migration of contaminants into a food product held in a container. Each has kept contaminants of all types from entering foodlike materials inside of a plastic bottle in excessive quantities.

Tests actually performed on various materials to determine their effectiveness as barriers involved first the construction of 12-ounce bottles having wall thicknesses generally in the range of 0.030 to 0.035 inch. Bottles were formed from high density polyethylene ("HDPE") and polypropylene. Multilayered bottles undergoing testing included HDPE with an EVOH barrier layer, HDPE with a nylon barrier layer, HDPE with a fluorinated inner surface, and HDPE with different polypropylene barriers.

More specifically, the HDPE and the polypropylene bottles had a uniform composition throughout. Fluorinated HDPE, of course, had only a thin, possibly monomolecular, layer of fluorination on the interior surface; it received this by contacting the polyethylene with fluorine gas at elevated temperatures after molding.

The HDPE/EVOH bottles had a construction of five coextruded layers. These included, with the respective target percentages stated in parentheses and starting from the exterior: HDPE(23.5)/ADH(1.5)/EVOH(3.5)/ADH(1.5)/HDPE(70). A second series of HDPE/EVOH used HDPE (20%)/Regrind(66%)/ADH(1%)/EVOH(2%)/ADH(1%)/HDPE(10%). The adhesive ("ADE") took the form of a modified polyethylene sold as Tymor by Morton. The HDPE/nylon bottles had the same construction and percentages as for first HDPE/EVOH bottles except that the adhesive took the form of an ethylene vinyl acetate sold as Plexar by Quantum Chemical Corporation, and of course nylon replaced EVOH.

The multilayered bottles including the polypropylene included first an outer layer of polyethylene and an inner, protective layer of random polypropylene copolymer with about one percent ethylene content. One series of these bottles utilized about 30 percent polypropylene on the interior layer while a second series utilized only about ten percent of polypropylene to impose a more severe test on the material. A further series of tests utilized a layer of polypropylene providing about 30 percent of the bottle's weight but including a blend of about 25 percent of ethylene found in domains.

The testing employed contaminants in each of the four classes recommended by the FDA. Toluene filled the role of a volatile, nonpolar organic material as well as a polymer-specific contaminant for the polyolefins. Chloroform represented a volatile, polar organic material; methyl salicylate filled the role of a nonvolatile, polar material; and 10 percent lindane in toluene represented the nonvolatile, nonpolar organic material. Aside from the lindane as indicated above, the other contaminants found use at substantially full strength.

The bottles with the ethyl alcohol solution underwent exposure to toluene, chloroform, and the solution of lindane in toluene by dipping them in the various liquids. The viscosity of the methyl salicylate required wiping it onto the bottles' exteriors. All of the bottles had an eight percent ethyl alcohol solution inside.

After exposure, the bottles remained capped and stored for periods of one, three, and ten days at 25° C. and 49° C. The FDA has suggested these temperatures since both lie above those at which the containers would actually be used. Thus, the 25° test applies to containers for food that would remain refrigerated during storage. This would include orange juice and milk for example. The 49° test applies to containers holding food at room temperature. This would include cranberry juice. The higher temperatures supposedly induce greater migration than would occur under the normal and appropriate conditions that the containers would face.

After these residence times, the alcohol solution in the various bottles underwent analysis to determine the contaminant concentrations in them. The results showed preliminarily that, in effect, the lindane did not migrate through any of the polymers. Accordingly, the lindane tests did not proceed under all of the conditions of the other contaminants.

Results of a substantially different nature occurred for the other contaminants. Thus, methyl salicylate, toluene, and chloroform migrated readily through the polyethylene bottles into the alcohol solution. Virtually no migration occurred through the pure polypropylene except for a minor amount of chloroform after 10 days' storage and at high contamination levels on the containers' exterior. Appreciable migration occurred for the contaminants (excepting lindane) through the nylon barrier especially after 10 days.

The multilayered polypropylene and EVOH bottles and the fluorinated bottles acted as very substantial barriers to the migration of the other contaminants in addition to lindane. Although they allowed the passage of some chloroform, they blocked the vast proportion of it. Additionally, the cleaning process similar to that used for recycled plastic appears to have a very substantial effect in removing isopropanol, a volatile polar organic compound. It probably will have the same effect on chloroform which falls in the same class of compounds. Moreover, the elevated temperatures needed for molding, based on the same reasoning will likely drive off additional chloroform. Further, the plastic appears to only absorb relatively minimal amounts of this class of compounds. Thus, $CHCl_3$ displays some ability to migrate even through these barriers; in reality however, because of the above, it should pose very little risk.

The bottles with the thinner (0.001 inch) layer of EVOH permitted the passage of somewhat more methyl salicylate over 10 days than did the thicker layer of EVOH. The 25 percent blend of polyethylene within the polypropylene permitted the passage of very minor amounts of the contaminants. The tests had exposed the bottles to extremely high levels of contaminants. Yet, the polypropylene, whether in layers or forming solid bottles, as well as the EVOH and fluorinated bottles, effectively blocked very large amounts of contaminants from reaching the interior of the containers they protected. This polypropylene appeared in a uniform copolymer form or in blends.

Accordingly, the use of polypropylene, EVOH, and fluorinated polyethylene as a barrier against contaminants from PCR resin in a container would appear propitious. A simple type of container making use of a polypropylene appears generally at 11 in FIG. 1. The container 11 includes the bottom 12, the side 13, and the neck 14 at the top.

Figure 2:
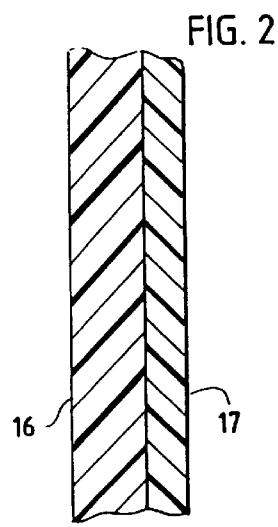
FIG. 2 provides an enlarged cross-sectional view along the line 2—2 view of the layers of plastic forming the container of FIG. 1.

As seen in FIGS. 1 and 2, the construction of the container 11 utilizes the thicker exterior layer 16 covered by the thinner barrier layer 17 on the inside. The postconsumer recycled resin appears in the outer layer 16. Typically, the PCR resin is composed primarily, if not exclusively, of polyethylene, most of ten high density polyethylene. The inner, or barrier, layer 17 includes the polypropylene.

Figure 3:
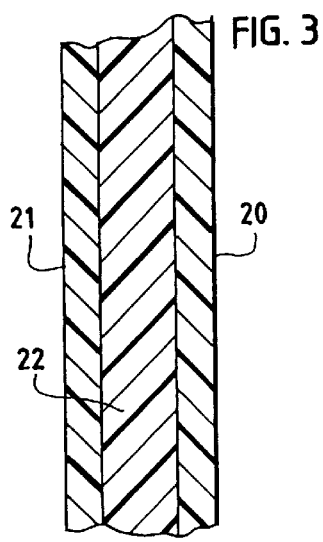
FIG. 3 shows a container wall similar to that of FIG. 2 but including a third layer with reground trim scrap.

A container construction more typical than that in FIGS. 1 and 2 appears in FIG. 3. The inner layer 20 again has a composition of polypropylene. The outer layer 21 takes the form of the PCR. The middle layer 22, in this construction, includes reground trim scrap. This comes from prior bottles, flash, and the like which can include portions of all three layers from prior moldings.

As an alternate construction the middle layer 22 may contain the PCR. The outer layer 21 may then include virgin resin with a pigment. Again, the inner layer 20 has the polypropylene.

Whether having the structure of FIGS. 2 or 3, the container has the inner layer 17 or 20, respectively, of polypropylene. At the very minimum, the layer of polypropylene 17 or 20 must provide a substantially continuous film toward the interior of the bottle. Specifically, it must lie more towards the inside of the bottle than does the PCR layer 16 or 21 and 22. This will keep contaminants from the PCR layers from entering and contaminating the food in the interior of the container. Typically, the polypropylene layer 17 or 20 should provide a thoroughly continuous film. This gives the best protection.

Extrapolating from the above, a polypropylene layer constituting even as little as one percent of the container's weight may serve as an adequate barrier. Where the polypropylene amounts to 10 percent of the container's weight, substantial assurance results for even higher levels of contaminants.

In general, the barrier should lie towards the interior of the container from virtually any layer containing PCR. This holds true, of course, whether the barrier takes the form of polypropylene, EVOH, or the fluorinated polyethylene. This configuration permits the barrier to stand between the contaminants in the PCR and the contents of the container. As discussed below, however, this configuration does not require the location of the barrier at the very interior of the container wall. In fact, the wall may include additional layers lying on the inside of the barrier. With regards to EVOH, in particular, a layer of polyolefin often appears useful in order to prevent deterioration of the gas-barrier properties of this material.

As discussed above, a polyolefin having less than 48 ppb. of contaminants, according to the FDA, does not require a barrier of any type. This results from the conclusion that the amount of contaminant that might enter the food stream from such material would pose no hazard to humans. If the container wall only included materials having contaminants having less than 48 ppb., it would require no barrier whatsoever.

Moreover, a container might include a layer with more than 48 ppb. and thus have a barrier between this PCR and the interior of a container. However, including between the barrier and the container's interior a further layer of a resin having contaminants but below the 48 ppb. level should pose no hazard either. The barrier would prevent the migration of the undesired chemicals from the highly contaminated PCR while the low level of such contaminants lying toward the interior of the barrier by themselves would give rise to no concern.

Further FIG. 1 shows the polypropylene layer 17 covering the entire interior of the container 11. That, of course, follows since the PCR layer 16 appears over the entire exterior of the container 11. An alternate construction might place the PCR resin over only a portion of the container, such as the bottom 12 and only the lower portion of the side wall 13. In this instance, having polypropylene cover similarly the interior of the bottom and also the lower portion of the side wall for at least the portion including the PCR might suffice to provide the required barrier against contaminants. In other words, where the PCR does not appear over the entire container 11, the polypropylene may itself need not cover the entire container 11 in order to provide an adequate barrier against the contaminants.

Furthermore, the inner layers 17 and 20 will most likely not have absolutely pure polypropylene. It typically includes some polyethylene or other comonomers. And, it may also take the form of a blend which has domains of other molecules, especially polyethylene as discussed in U.K. patent specification 1,346,234 to the Mitsui Petrochemicals Inds., Ltd.

Naturally, the amount and type of contaminants will have an effect upon the thickness required of the barrier layer to provide the effective continuous film of polypropylene that will adequately protect against the contaminants from the PCR. The method of determining the exact thickness required should not pose any particular difficulty. Containers incorporating layers of different thicknesses of the type of polypropylene desired can undergo the types of testing described above to determine the amount of contaminants that could pass through. This would show the required thickness for preventing the passage of unacceptable layers of contaminants.

Typically, the polypropylene layer 17 or 20 will constitute at least about one percent of the weight of the entire container 11. It may even have a thickness that will provide 10 percent or more of the container's weight.

To prove practicable, the container should incorporate at least about 15 percent of its weight in PCR resin. Some states, in fact, have under consideration a requirement that the container include at least 25 percent by weight PCR. That, of course, would fall in the outer layer 16 in FIG. 2. The layer 16 could also include virgin polyethylene or polymers to constitute the remaining amount of the container wall.

In FIG. 3, the PCR appears in the two outer layers 21 and 22. These will hold the required quantity of PCR. If the PCR amounts to 25 percent, then the outer layer, for example, could take the form of only recycled polyethylene and constitute 15 to 20 percent by weight of the entire container. The inner layer 22 would then provide the remaining 5 to 10 percent of the desired recycled polyethylene. It could also include reground polypropylene and virgin resin.

When the inner layer 20 constitutes about 30 percent by weight of the container and the exterior layer 21 amounts to 15 to 20 percent, then the middle layer 22 will amount to about 50 to 55 percent by weight of the container. In general, of course, the desired amount of PCR resin as well as the available trim scrap will determine the amount of the virgin plastic introduced into the outer layer 16 of FIG. 2 or the middle layer 22 of FIG. 3. Naturally, the amount of PCR resin may increase and form substantially all of the container 11. That, of course, would necessitate a barrier layer 17 or 20 of sufficient thickness to prevent the migration of an unacceptable level of the contaminants from this type of outer layer.

In the structure shown in FIG. 2, the outer layer 16 may, in fact, include no PCR resin. In other words, it may simply only have virgin resin possibly with ground trim scrap. In this fashion, the polypropylene 17 may provide protection against the bottle's contents crazing the surface of the outer layer 16. It may also provide a barrier where the bottle makes contact with contaminants from the exterior which may travel through the outer layer 16 similar to the tests discussed above.

Figure 4:
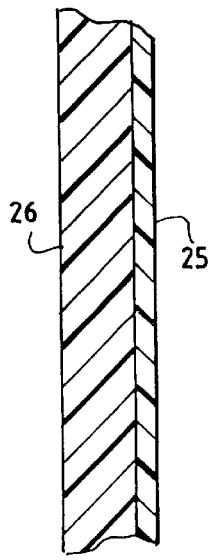
FIG. 4 provides a figure similar to that of FIG. 2 of a container wall incorporating two layers but in which the inner layer takes the form of EVOH.

FIG. 4 gives a cross-sectional view of a simplified structure using EVOH as a barrier to contaminants from PCR. There, the inner layer 25 is the EVOH while the outer layer 26 includes the PCR. It may have only the PCR or it may also incorporate virgin resin and ground trim scrap. Again, to prove practical, it should have at least 15 percent and most likely 25 percent by weight of the entire container in the form of PCR resin.

Figure 5:
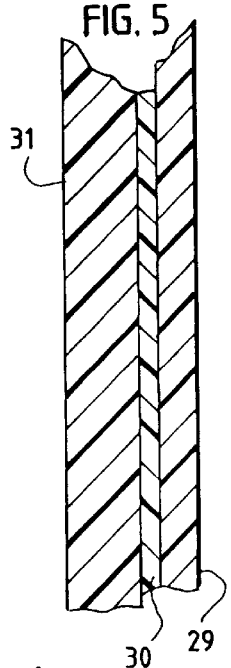
FIG. 5 gives a cross-sectional view of a container wall similar to that of FIG. 4 but further including a layer of polyolefin lying on the interior of the EVOH.

Typically, EVOH does not sit on either the interior or exterior surface of a container. This results from the fact that moisture can degrade its ability to act as a gas barrier. Accordingly, FIG. 5 shows a wall structure similar to FIG. 4 except that it has the layer 29 of polyolefin lying on the inside of and protecting the EVOH layer 30. This keeps the moisture from the interior of the container from attacking the EVOH. The polyolefin may take the form of either polyethylene or polypropylene. The former probably represents the preferred choice since it costs less. Either may constitute around 10 percent of the container's weight. The extra layer 31 again contains the PCR resin.

Figure 6:
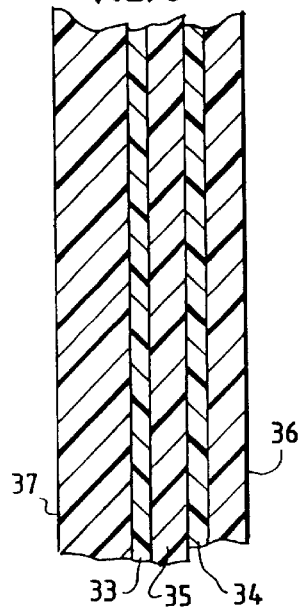
FIG. 6 shows a cross-sectional view of a container wall similar to that of FIG. 5 but including a layer of adhesive on either side of the EVOH.

Plastic attached directly to EVOH displays a tendency to delaminate. Accordingly, the wall structure of FIG. 6 provides an adhesive, generally in the form of a modified polyethylene, as the two layers 33 and 34 surrounding the EVOH 35. Using a different polyolefin as the interior layer 36 would indicate choosing a specific adhesive for the layer 34. Again a layer of polyolefin 36 lies toward the inside of the EVOH 35 to protect it (as well as its adhesive 34) from the contents of the container's interior. The PCR resin layer 37 lies to the outside and attaches to the outer layer of adhesive 33.

Figure 7:
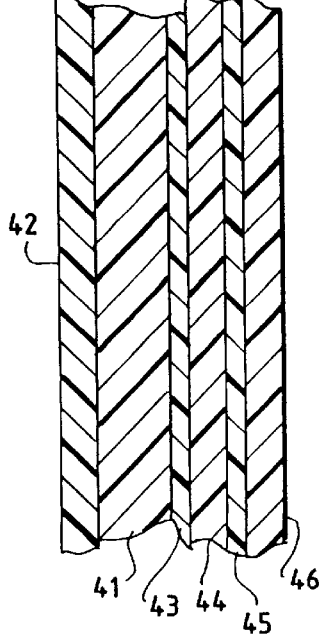
FIG. 7 illustrates a container wall similar to that of FIG. 6 but also including a layer of reground trim scrap.

The wall structure shown in FIG. 7 differs from that in FIG. 6 by including the layer of ground trim scrap 41. This would include components from all of the other layers and prior moldings. It sits between the PCR resin 42 and the outer layer of adhesive 43 which attaches it to the EVOH 44. The inner layer of the adhesive 45 then attaches the EVOH to the layer of polyethylene 46. A discussion of the general forms of adhesive that may find use as the layers 33 and 34 in FIG. 6 and 43 and 45 in FIG. 7 appears in U.S. Pat. No. 4,182,457 to M. Varnada et al. and U.S. Pat. No. 4,254,169 to G. O. Schroeder. Typically, the bottle will include about two to four percent by weight of the EVOH; more generally, it should fall within the range of around 1.5 to 13 percent. Each of the adhesive layers will constitute about one to two percent of the container's weight.

Typically, the inner layer 29, 36, and 46 of FIGS. 5, 6, and 7, respectively, provide about 30 percent of the container's weight. As suggested above, the polyolefin would typically appear as polyethylene.

The PCR resin in the layer 26 of FIG. 4, the layer 31 of FIG. 5, the layer 37 of FIG. 6, and the layers 41 and 42 of FIG. 7 provide the requisite amount of recycled resin. Minimally, this amounts to about 15 percent, but may even rise to 25 percent or more. These layers may include virgin resin and, in the intermediate layer 41 of FIG. 7, ground scrap.

In the structure shown in FIG. 7, the intermediate layer 41 may constitute about 30 to 35 percent of the weight of the container and, typically, include approximately five to ten percent virgin resin, 20 to 30 percent reground scrap. The outer layer 42 provides around 30 to 35 percent of the bottle's weight and will contain approximately 15 to 20 percent of the bottle's weight of PCR and 15 to 20 percent of the bottle's weight of regrind. This, of course, permits the inner layers 41, and 43 to 46 to protect the container's contents from contaminants. For a colored container, the outer layer 42 may contain pigment, reground and virgin resin; The PCR will then appear in the layer 41.

Figure 8:
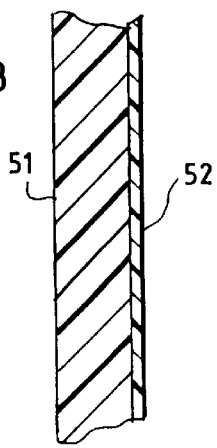
FIG. 8 gives a cross-sectional, enlarged view of a portion of a container wall utilizing a film of fluorinated polyethylene to prevent the migration of contaminants from recycled polyethylene into the container's interior.

FIG. 8 shows a portion of a container wall having the layer 51 of plastic containing post-consumer recycled resin. The fluorinated polyethylene film 52 has a location toward the interior of the container from the PCR-containing layer 51. FIG. 8 diagrams the film 52 as entirely separate from the layer 51. In fact, of course, the film 52 may include a surface portion of the layer 51 which has undergone fluorination to create the continuous film of fluorinated polyethylene. The container wall in FIG. 9 similarly has the layer 55 of PCR-containing resin. The film 56 of fluorinated polyethylene again protects against migration of contaminants into the container's interior. However, the additional layer 57 may include trim scrap from prior moldings or even virgin resin such as polyethylene. In fact, in this instance the film 56 results from the fluorination of the polyethylene in the intermediate layer 57 rather than the PCR layer 55. As a particular example, the intermediate layer 57 may represent approximately 20 percent of the container's weight while the outer layer 55 provides the remaining 80 percent. As suggested by these numbers, the fluorinated film 56 constitutes a minuscule portion of the container's weight.

The preparation of the PCR for the containers diagrammed in the figures typically involves the comminuting or otherwise reducing the size of the pieces of the previously used plastic. This puts the plastic into small, useful pellets or sections in which it may find further use in the making of new containers.

After the size reduction of the plastic, it typically will undergo some form of washing. This has the effect of removing a substantial portion of the contaminants especially from the superficial areas of the plastic. After drying, the PCR goes through an extruder and filter and departs as pellets.

Then, the PCR may become mixed with other resin. The additional material may take the form of virgin plastic or reground trim scrap or both. This mixing with other plastic further dilutes the contaminants.

The plastic, whether composed entirely of PCR or a mixture of PCR with other resin, has become ready for molding by any one of a number of processes. All of these, of course, involve subjecting the plastic resin, including specifically the PCR, to highly elevated temperatures to melt them. These temperatures and the concomitant melting of the plastic may drive off some contaminants originally present in the PCR. Volatile organic compounds, such as chloroform, would likely display a substantial vulnerability to their partial removal in this fashion.

The step of heating and subsequent molding may even reduce some of the contaminants to a level where they might not in fact need a barrier. But in any event, reducing the amount of contaminant in the container whether through the washing or the heating and molding processes reduces the standards that a barrier must meet. It need only prevent the migration of that amount of contaminant which otherwise would, if contained in the actual edible material, exceed the FDA limits discussed above.

Any of the available molding techniques, of course, can find use to make containers from the melted resin. For a single-layer container with the fluorinated interior surface, this involves merely the injection or blow molding of the resin. This step could produce the container directly. Alternatively, it could create an intermediate form from which subsequent steps would create the desired container. Thus, extrusion and injection molding can both create a parison. The parison, in turn, can undergo blow molding to create the final container.

Additionally, extrusion may find use to create sheets of the plastic. These sheets can undergo thermoforming, such as vacuum forming, to provide the container.

Coextrusion will form sheets or parisons in which the different layers have been extruded simultaneously. Alternatively, monolayer thin sheets, or films, may emanate from the extruder. Placing these together can produce flexible plastic packaging utilizing PCR with a protective barrier.

In any event, the creation of the containers with the fluorinated barrier then involves contacting the layer of polyethylene 51 with fluorine gas. This could occur anywhere during the actual molding of the container. Thus, the gas used during extrusion molding to form the parison may include fluorine gas. Or, the pressure for blow molding the parison into the final container may provide the fluorine. Effectuating the fluorination in this manner has the advantage of contacting the polyethylene layer 51 with the fluorine at the elevated temperatures of the molten plastic. These elevated temperatures provide conditions of high reactivity for the fluorine in contact with the polyethylene. Lower temperatures may suffice although that may require longer reaction times or higher fluorine concentrations in the gas mixtures.

Figure 9:
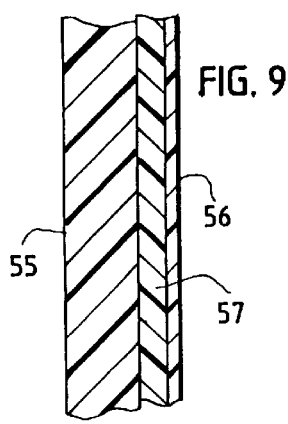
FIG. 9 provides a view of a container wall similar to that of FIG. 8 but including a layer of reground trim scrap between the recycled polyethylene and the fluorinated film.

Producing the multilayer container of FIG. 9 proceeds in a very similar fashion to the production of the single-layer container of FIG. 8. This, however, would of course require coinjection or coextrusion of the multiple layers 55 and 57. This again could create either an intermediate parison or the final container. In the former case, further molding would provide the final container. Again, the fluorination to create the protective film 56 can occur during any of the stages of molding or subsequently.

The containers of FIGS. 1 to 7 all have multiple layers of plastic. This typically involves the coextrusion or coinjection molding of an article from the original molten resins. Again, this first step may provide either the final container or an intermediate article. In the latter case, blow molding or thermoforming will provide the final container.

Accordingly what is claimed is:

1. A container having a wall defining an interior and an exterior, at least a part of said wall comprising a plurality of layers including:

(A) a first layer having post-consumer recycled polyethylene resin;

(B) a second layer formed on the surface of and in intimate contact with said first layer, said second layer having a substantially continuous film of EVOH, said film occurring at a portion of said part of said wall wherever said first layer occurs and being located, at said portion, toward the interior of said container from said first layer, said second layer comprising a barrier layer to impede the migration of PCR contaminants.

2. The container in claim 1 wherein said film is continuous.

3. The container of claim 2 wherein said film is located toward the interior from all layers containing at least about 48 ppb./0.020 in. of contaminant.

4. The container of claim 2 wherein said portion is a first portion and said film is a first film and further comprising a third layer having a second continuous film of a polyethylene or polypropylene, said second film occurring at a second portion of said part of said wall wherever said first film occurs and being located, at said second portion, toward the interior of said container from said second layer.

5. The container of claim 4 wherein said post-consumer recycled resin comprises at least about 15 percent by weight of said container.

6. The container of claim 5 wherein said post-consumer recycled plastic resin at least about 25 percent by weight of said container.

7. The container of claim 5 wherein said second continuous film is of polypropylene.

8. The container of claim 7 wherein said film of polypropylene constitutes at least about one percent by weight of said container.

9. The container of claim 8 wherein said film of polypropylene constitutes at least about 10 percent by weight of said container.

10. The container of claim 5 further including an adhesive in contact with said EVOH.

11. The container of claim 5 further including a fourth layer between said first and second layers and a fifth layer between said second and third layers, both of said fourth and fifth layers being in contact with said EVOH and providing adhesiveness between said EVOH and the layers of said container lying adjacent to said fourth and fifth layers away from said EVOH.

12. The container of claim 11 further including a sixth layer located on the exterior from said fourth layer, said sixth layer comprising reground trim scrap of materials contained in said first to fifth layers.

13. The container of claim 5 wherein said post-consumer recycled resin has greater than about 48 ppb./0.020 in. of contaminant.

14. The container of claim 5 wherein said EVOH comprises about 1.5 to 13 percent by weight of said container.

15. The container of claim 14 wherein said EVOH comprises about two to four percent by weight of said container.

16. The container of claim 5 wherein said film has a sufficient thickness and the capability of preventing the passage from post-consumer recycled resin into said interior of said container of more than about 20 parts per billion by weight of a contaminant from said first layer in 10 days.

17. The container of claim 5 wherein said film has a sufficient thickness and the capability of preventing the passage from post-consumer recycled resin into said interior of said container of more than about one percent of the contaminants in said first layer in 10 days.

18. The container of claim 5 wherein said container is blow molded.

19. The container of claim 5 wherein said container is thermoformed.

20. The container of claim 5 wherein said container is injection molded.

21. The container of claim 5 wherein said post-consumer recycled resin includes a majority of polyethylene.

* * * * *

US006194043C1

(12) EX PARTE REEXAMINATION CERTIFICATE (9555th)

United States Patent
Fehn

(10) Number: US 6,194,043 C1
(45) Certificate Issued: Mar. 12, 2013

(54) CONTAINER WITH RECYCLED PLASTIC

(75) Inventor: Gregory M. Fehn, Barrington, IL (US)

(73) Assignee: Deutsche Bank Trust Company Americas, New York, NY (US)

Reexamination Request:
No. 90/012,010, Nov. 16, 2011

Reexamination Certificate for:
Patent No.: 6,194,043
Issued: Feb. 27, 2001
Appl. No.: 08/917,044
Filed: Aug. 19, 1997

Related U.S. Application Data

(62) Division of application No. 08/284,893, filed on Aug. 2, 1994, now Pat. No. 5,693,283.

(51) Int. Cl.
*B32B 27/32* (2006.01)
*B65D 1/02* (2006.01)
(52) U.S. Cl. .................... 428/36.91; 215/12.1; 215/12.2; 220/592.16; 220/62.12; 220/62.13
(58) Field of Classification Search .................... None
See application file for complete search history.

(56) References Cited

To view the complete listing of prior art documents cited during the proceeding for Reexamination Control Number 90/012,010, please refer to the USPTO's public Patent Application Information Retrieval (PAIR) system under the Display References tab.

*Primary Examiner* — Elizabeth McKane

(57) ABSTRACT

A container incorporating post-consumer recycled ("PCR") plastic and a method of making that type of container. The container utilizes a layer of polypropylene or EVOH or a film of fluorinated polyethylene toward the interior from the recycled plastic to prevent contaminants from the latter entering the container's contents. When utilizing EVOH, the container usually has an additional layer of polyethylene or polypropylene covering the EVOH to prevent its deterioration by moisture. Making the container involves first composing a resin including the recycled plastic. Forming the various layers listed above produces a container that includes recycled plastic and a barrier to limit the migration of contaminants f from the recycled material to the container's contents. This permits the use of the resulting containers for food. For a fluorinated polyethylene film, fluorination can occur either during or after the container's formation.

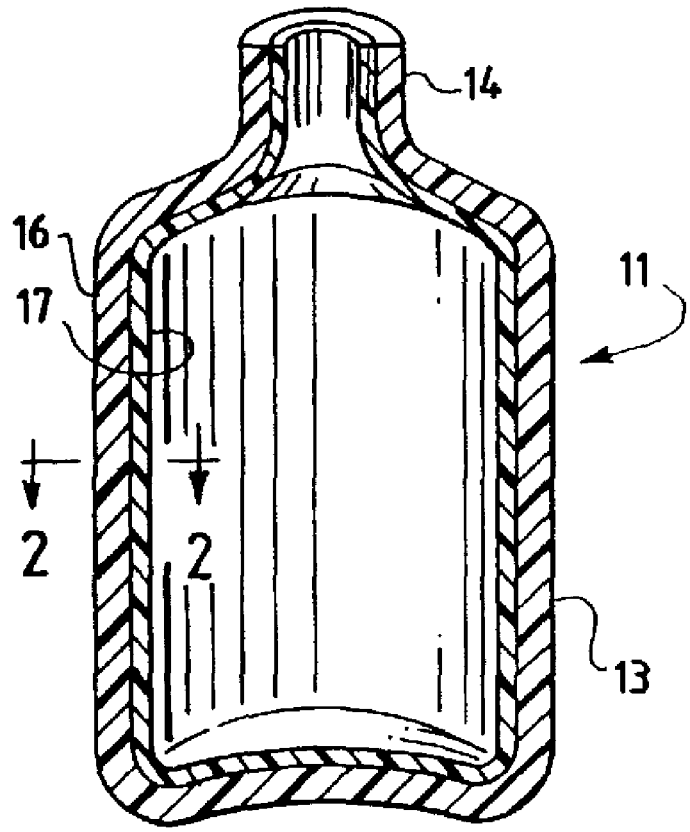

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-21 are cancelled.

* * * * *